United States Patent
Satoh et al.

(10) Patent No.: US 11,062,731 B1
(45) Date of Patent: Jul. 13, 2021

(54) SOLDER BUMP HEIGHT STABILIZATION FOR MICRO AND FINE PITCH ELECTRODE PADS

(71) Applicant: Western Digital Technologies, Inc., San Jose, CA (US)

(72) Inventors: Takuya Satoh, Miura-gun (JP); Yuhsuke Matsumoto, Fujisawa (JP); Hiroyasu Tsuchida, Fujisawa (JP); Kouji Takei, Ebina (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/872,222

(22) Filed: May 11, 2020

(51) Int. Cl.
*G11B 5/48* (2006.01)

(52) U.S. Cl.
CPC ................... *G11B 5/4826* (2013.01)

(58) Field of Classification Search
None
See application file for complete search history.

(56) References Cited

U.S. PATENT DOCUMENTS

| | | | | |
|---|---|---|---|---|
| 3,486,223 | A * | 12/1969 | Butera | H05K 3/3436 29/840 |
| 4,761,699 | A * | 8/1988 | Ainslie | G11B 5/3106 29/603.01 |
| 5,530,604 | A | 6/1996 | Pattanaik | |
| 5,680,275 | A | 10/1997 | Frater et al. | |
| 5,821,494 | A | 10/1998 | Albrecht et al. | |
| 6,318,624 | B1 | 11/2001 | Pattanaik et al. | |
| 7,400,470 | B2 | 7/2008 | Matsumoto et al. | |
| 8,213,121 | B2 | 7/2012 | Dela Pena et al. | |
| 8,295,011 | B2 * | 10/2012 | Chou | G11B 5/105 360/234.5 |
| 8,477,457 | B2 * | 7/2013 | Matsumoto | G11B 5/4826 360/234.5 |
| 9,953,669 | B1 | 4/2018 | Klarqvist et al. | |
| 10,643,645 | B2 * | 5/2020 | Davidson | G11B 5/4826 |
| 2016/0322072 | A1 * | 11/2016 | Puttichaem | G11B 5/486 |
| 2019/0333532 | A1 * | 10/2019 | Wessel | G11B 5/3169 |

FOREIGN PATENT DOCUMENTS

JP 02058229 A * 2/1990

OTHER PUBLICATIONS

Son, Jihye et al., HV-SoP Technology for Maskless Fine-Pitch Bumping Process, Electronics and Telecommunications Research Institute (ETRI) Journal, received May 13, 2014, revised Jan. 6, 2015, accepted Jan. 17, 2015, pp. 523-532, ETRI Journal 2015; vol. 37(3), Science Central.

* cited by examiner

*Primary Examiner* — William J Klimowicz
(74) *Attorney, Agent, or Firm* — John D. Henkhaus

(57) ABSTRACT

Approaches to pre-forming solder bumps, such as for use in electrically connecting a head slider and a suspension assembly for a hard disk drive, involves applying a height stabilizer plate over a shared solder paste applied over a substrate housing electrode pads, and reflowing the solder paste with the plate applied to create solder bumps electrically coupled to the pads. Use of such a plate functions to stabilize and contain the solder paste and create uniform solder bumps across the series of pads, where the plate may be composed of a heat-resistant and anti-solder-wetting material. The solder bump pre-forming techniques generally enable solder bonding of extremely small electrical interconnection pads.

14 Claims, 9 Drawing Sheets

SOLDER BUMP HEIGHT STABILIZATION FOR MICRO AND FINE PITCH ELECTRODE PADS

FIELD OF EMBODIMENTS

Embodiments of the invention may relate generally to a hard disk drive and particularly to an approach to controlling the height and/or shape of a solder bump for electrically coupling a head slider to a suspension assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head"), and a suspension assembly. Each slider is attached to the free end of a suspension assembly that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head. Positioned between the mount plate and the functional end of the load beam is a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to controlling the height and shape of a solder bump for electrically connecting a head slider to a suspension assembly are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Figure 2A:
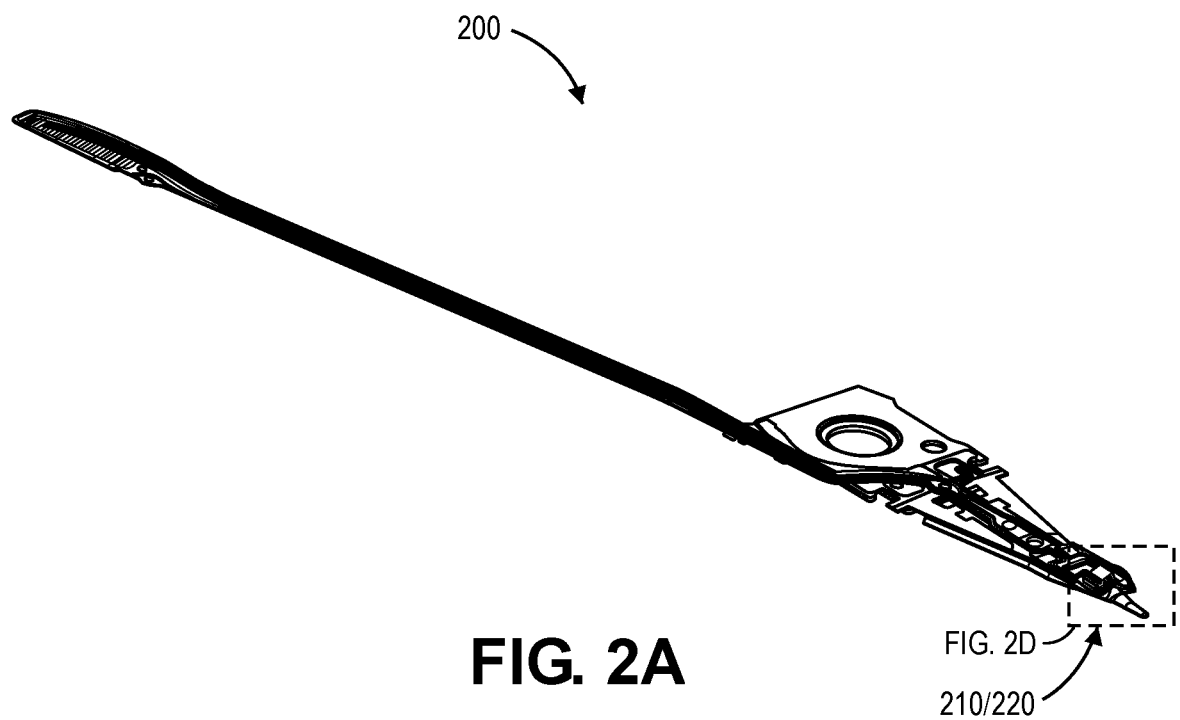
FIG. 2A is a perspective view illustrating a head gimbal assembly (HGA), according to an embodiment.
Figure 2B:
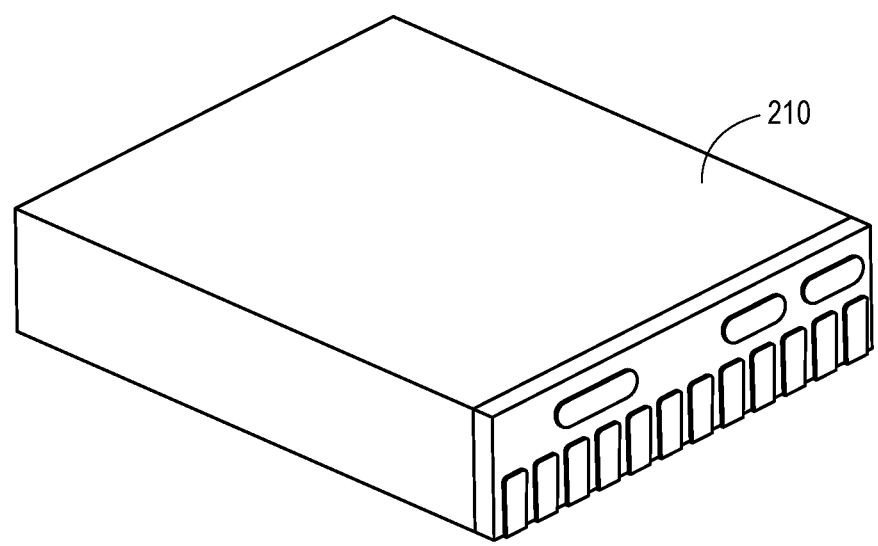
FIG. 2B is a perspective view illustrating a read-write head of the HGA of FIG. 2A, according to an embodiment.
Figure 2C:
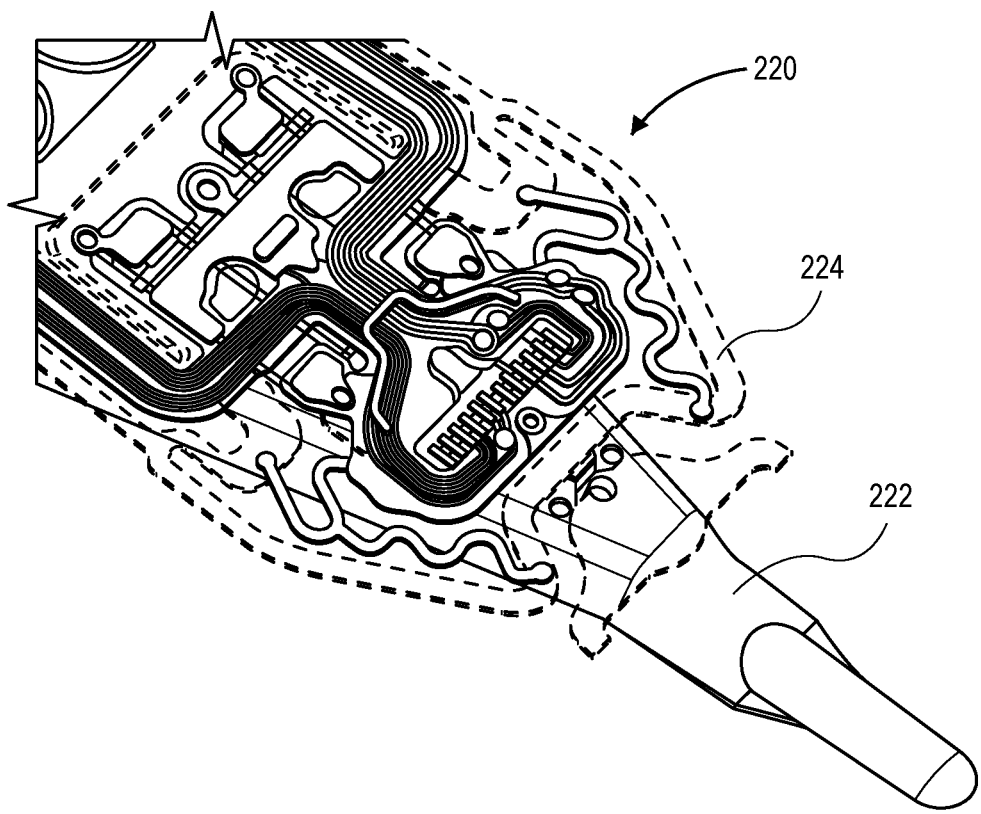
FIG. 2C is a perspective view illustrating a suspension assembly of the HGA of FIG. 2A, according to an embodiment.
Figure 2D:
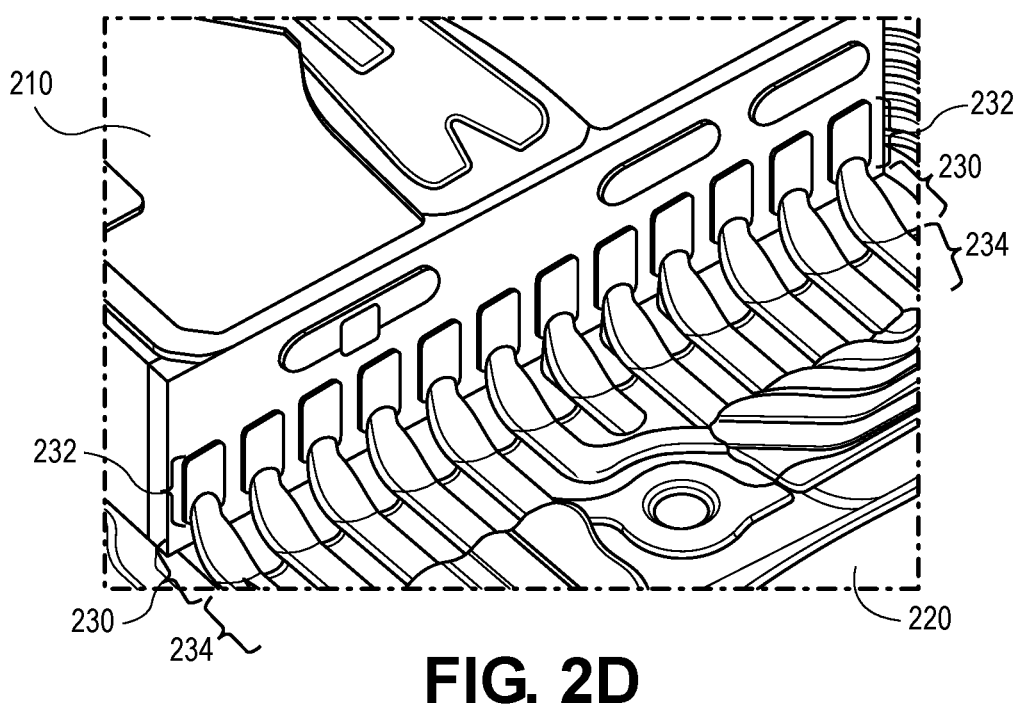
FIG. 2D is a magnified perspective view illustrating electrical interconnections between the read-write head of FIG. 2B and the suspension assembly of FIG. 2C of the HGA of FIG. 2A, according to an embodiment.

FIG. 2A is a perspective view illustrating a head gimbal assembly (HGA), FIG. 2B is a perspective view illustrating a read-write head of the HGA of FIG. 2A, FIG. 2C is a perspective view illustrating a suspension assembly of the HGA of FIG. 2A, and FIG. 2D is a magnified perspective view illustrating electrical interconnections between the read-write head of FIG. 2B and the suspension assembly of FIG. 2C of the HGA of FIG. 2A, according to an embodiment. For context, HGA 200 (FIG. 2A), when installed, is constituent to a hard disk drive (HDD), typically as part of a head stack assembly (HSA). HGA 200 comprises a head slider 210 (FIG. 2B) housing a read-write transducer, and a suspension 220 (FIG. 2C) typically comprising a load beam 222 and a flexure 224 and housing the slider 210. FIG. 2D depicts the interconnections 230 electrically connecting a group of electrode pads 232 on the slider 210 with a corresponding group of electrode pads 234 on the suspension 220. The viability and reliability of these electrical interconnections 230 between the slider 210 and the suspension 220 is a concern in view of a trend toward increasing numbers of electrode pads 232, 234 needed for emerging HDD technologies.

One particular approach to solder ball bonding very small components, such as a head slider to a suspension, is through use of a solder ball bonding (SBB) tool, or solder ball jet (SBJ), that includes a solder ball reservoir or tank in positional relation to a rotatable feed plate. According to one SBJ approach, a supply of solder balls (or "micro solder balls") is housed in the reservoir, from which solder balls are fed one-by-one to the rotatable feed plate. The feed plate then rotates into one or more other process positions for enabling irradiation of and ejection of solder balls onto the workpieces to be interconnected, such as the head slider and the suspension. Within the context of hard disk drive (HDD) technology, the number of slider and suspension electrical interconnections and thus connection pads is trending to increase over time due to the implementation of new technologies, such as heat-assisted magnetic recording (HAMR), for one example. Consequently, to make room for the additional electrical connection pads the size of the pads and of the solder balls used to bond the slider to the suspension, as well as the gaps between the pads, are expected to decrease commensurately. For non-limiting examples, HDDs are expected to need 16 to over 18 slider pads in upcoming products, with corresponding pad widths reducing to 25 μm and gap widths reducing to 9 μm. Thus, conventional SBJ technology is not expected to be able to extend to such a small solder ball size, e.g., 25 μm solder balls may not be manufacturable in volume and solder ball feed unit pick-up holes may not be producible at such a minute size. Consequently, a decline in yield is expected to follow, due to poor and/or open solder joints, solder bridges between adjacent electrical connection pads, and the like.

Hence, in a move away from the historical use of SBJ technology for electrically interconnecting micro-components such as the head slider (e.g., slider 210 of FIGS. 2B, 2D) and the suspension (e.g., suspension 220 of FIGS. 2C, 2D), "pre-solder" technology in which "pre-solder" solder pads (or simply "solder bumps") are pre-formed on the suspension for example, may be desirable.

Figure 3:
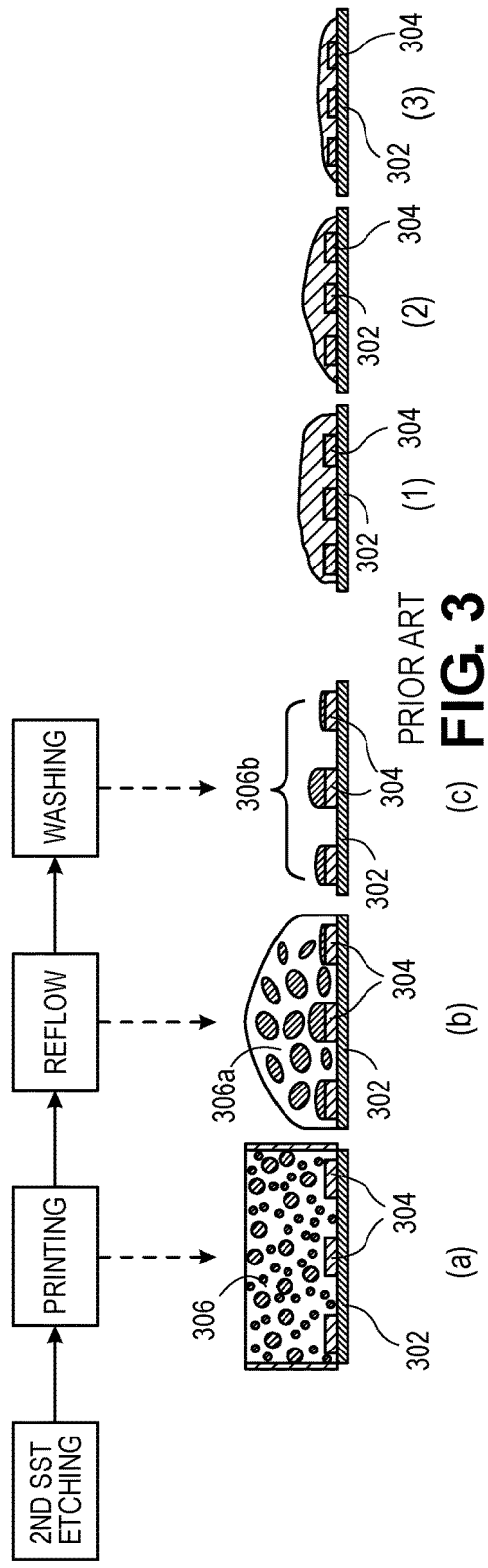
FIG. 3 is a diagram illustrating a conventional solder bump production process.

FIG. 3 is a diagram illustrating a conventional solder bump production process. FIG. 3 depicts various stages of a solder bump production process, in cross-section, including (a) printing, (b) reflow, and (c) washing, all of which may be and are typically performed after an etching procedure to prepare a substrate such as a stainless steel flexure (e.g., flexure 224 of FIG. 2C) of a suspension 220 (FIG. 2C). The printing stage (a) depicts a substrate 302 on which a plurality of electrode pads (e.g., gold pads) 304 is previously formed, over which a solder paste 306 (e.g., a mixture of powdered solder and flux) is applied. According to traditional industry standard using high density and high viscosity solder paste, the solder paste would be applied over or within the confines of a "micro-area" solder printing mask (not shown here). Next, at the reflow stage (b) the workpiece (e.g., comprising the substrate 302, pads 304, and solder paste 306) is subject to controlled heating which reflows the solder paste 306a in a molten state to create a solder bump over each of the electrode pads 304.

With the evolution of the production of micro and fine pitch electrode pads, the fabrication of such a micro-area mask has generally been thwarted because of the extremely small pad width and pitch. Thus, a low density and low viscosity "super solder" has been developed, which can be used in a similar process as illustrated in FIG. 3, however, without the need for a micro-area mask. The cross-sectional snapshots to the right of FIG. 3 depict the progression of the reflowing of the solder paste 306a at various increasing reflow temperatures (1)-(3), whereby the low density, low viscosity solder paste 306a tends to overflow and spread to other portions of the workpiece. Consequently, this uncontrolled overflow likely results in unstable and nonuniform solder bump 306b heights, as further depicted at the washing stage (c) of FIG. 3. Thus, with the use of a "mask-less" low density, low viscosity solder paste, it can be significantly challenging to form consistent solder bump shapes and heights due at least in part to the aforementioned solder overflow issue.

Forming Height-Stabilized Pre-Formed Solder Bumps

Figure 4:
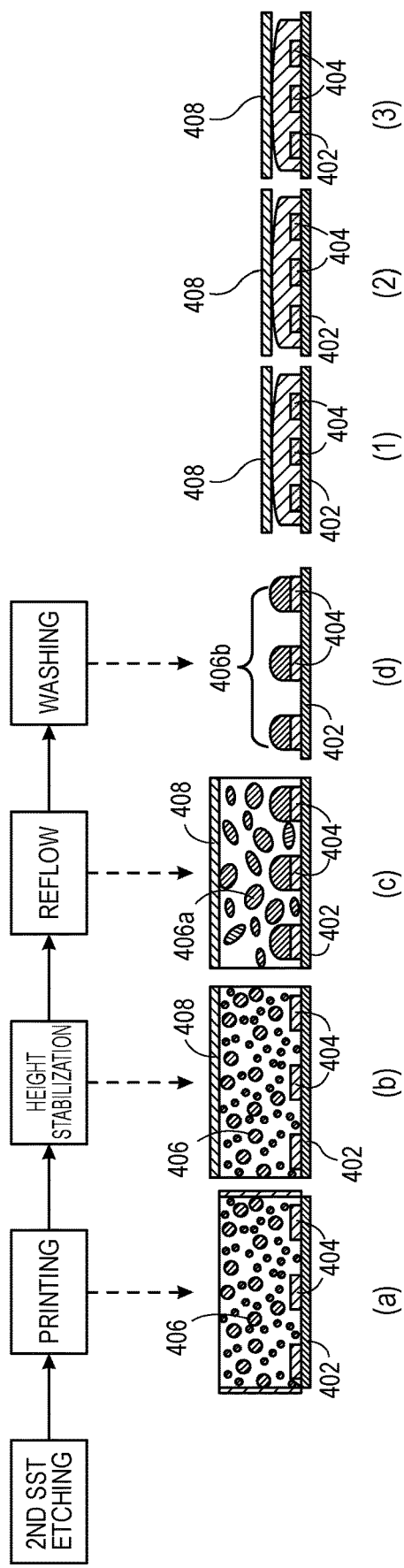
FIG. 4 is a diagram illustrating a pre-solder bump production process, according to an embodiment.

FIG. 4 is a diagram illustrating a pre-solder bump production process, according to an embodiment. FIG. 4 depicts various stages of an innovative solder bump production process, in cross-section, including (a) printing, (b) height stabilization, (c) reflow, and (d) washing, according to an embodiment. Again, these procedural steps may be performed after an etching procedure to prepare a substrate such as a stainless steel flexure (e.g., flexure 224 of FIG. 2C) of a suspension 220 (FIG. 2C). The printing stage (a) depicts a substrate 402 on which a plurality of electrode pads (e.g., gold pads) 404 is previously formed, over which a solder paste 406 is applied, e.g., a layer of solder paste 406 applied over and thus shared by at least a certain portion of the pads 404. At the height stabilization stage (b), a height stabilizer plate 408 (or simply "plate 408") is applied over the solder paste 406, details of which are described in more detail elsewhere herein. Next, at the reflow stage (c) the workpiece (e.g., comprising the substrate 402, pads 404, and solder paste 406) is subject to controlled heating which reflows the solder paste 406a in a molten state to create a series of substantially uniform solder bumps 406b over the corresponding electrode pads 404, as further depicted at the washing stage (d) of FIG. 4 after the plate 408 is removed and excess solder paste is removed from the gaps between the electrode pads 404 and solder bumps 406b. The cross-sectional snapshots to the right of FIG. 4 depict the progression of the reflowing of the solder paste 406a at various increasing reflow temperatures (1)-(3), whereby the low density, low viscosity solder paste 406a can be uniformly held in place on the flexure (see, e.g., flexure 224 of FIG. 2C) by the height stabilizer plate 408 during reflow, to stabilize and contain the solder paste 406a and create the uniform solder bumps 406b. Further, the solder paste 406a thickness and flow can be adjusted and managed as desired, enabled by the use of the plate 408 during and/or throughout the solder reflow stage.

According to an embodiment, the height stabilizer plate 408 is composed of a heat-resistant and anti-wetting (relative to solder) material, so that the plate 408 can withstand and maintain its shape during the high-heat solder reflow process and so that the plate 408 is able to hold the solder paste 406a in place during such reflow process. Hence, according to alternative embodiments, the height stabilizer plate 408 may be composed of a material such as glass, ceramic, titanium, or stainless steel. According to an embodiment, the height stabilizer plate 408 is applied directly over the solder paste 406 with no significant intervening barrier.

Figure 5A:
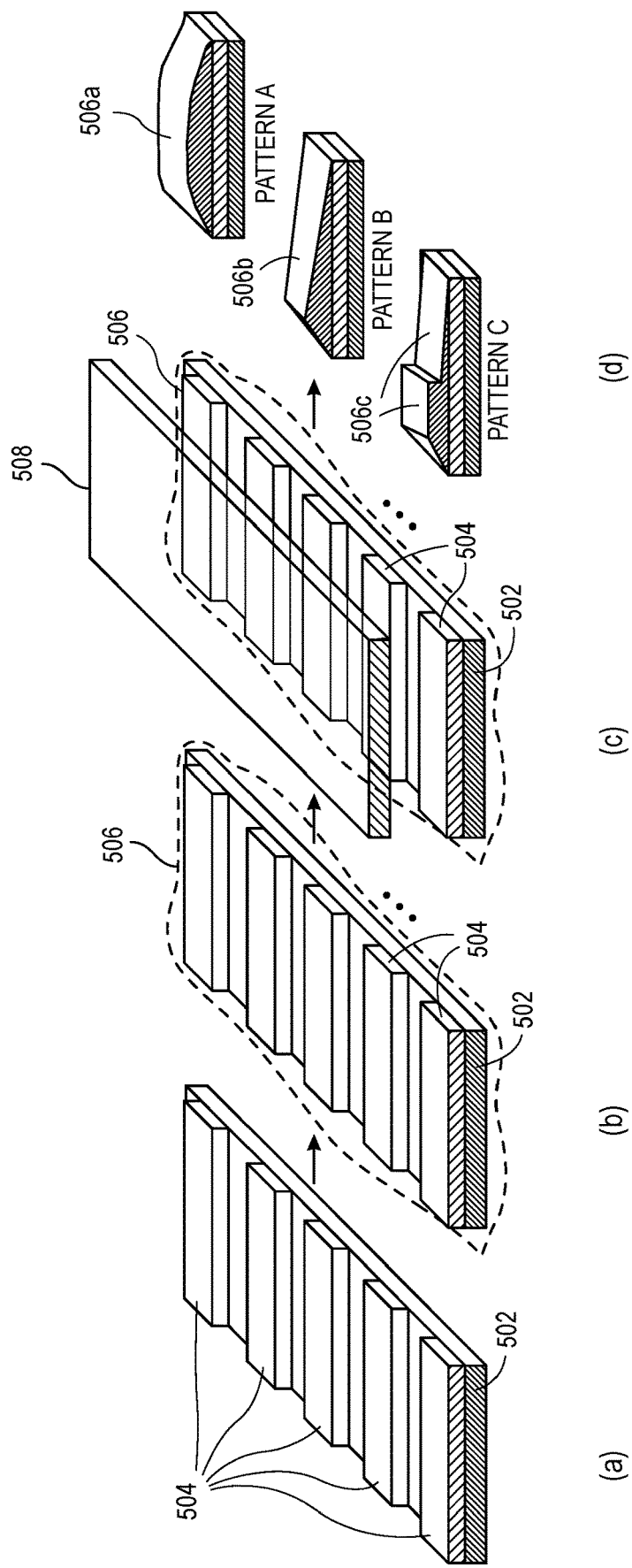
FIG. 5A is a diagrammatic perspective view illustrating a pre-solder bump production process, according to an embodiment.

FIG. 5A is a diagrammatic perspective view illustrating a pre-solder bump production process, according to embodiments. FIG. 5A illustrates a same or similar production process as that illustrated in FIG. 4, albeit from a different perspective, depicting the various stages of an innovative solder bump production process. Again, these procedural steps may be performed after an etching procedure to prepare a substrate such as a stainless steel flexure (e.g., flexure 224 of FIG. 2C) of a suspension 220 (FIG. 2C). The first stage (a) depicts a substrate 502 on which a plurality of electrode pads (e.g., gold pads) 504 is previously formed. The second stage (b) depicts applying a solder paste 506 over the substrate 502 and pads 504. At stage (c), a height stabilizer plate 508 (or simply "plate 508") is applied over the solder paste 506, and the solder paste 506 is reflowed by subjecting the workpiece (e.g., comprising the substrate 502, pads 504, and solder paste 506) to controlled heating to reflow the solder paste 506 to create a series of substantially uniform solder bumps 506a, 506b, 506c of a chosen shape, height, configuration over the corresponding electrode pads 504, as depicted at stage (d). To reiterate, a suitably dense and viscous solder paste 506a can be uniformly held in place on the flexure by the plate 508 during reflow, to stabilize the solder paste 506 and create the uniform solder bumps 506a, 506b, or 506c.

Figure 5B:
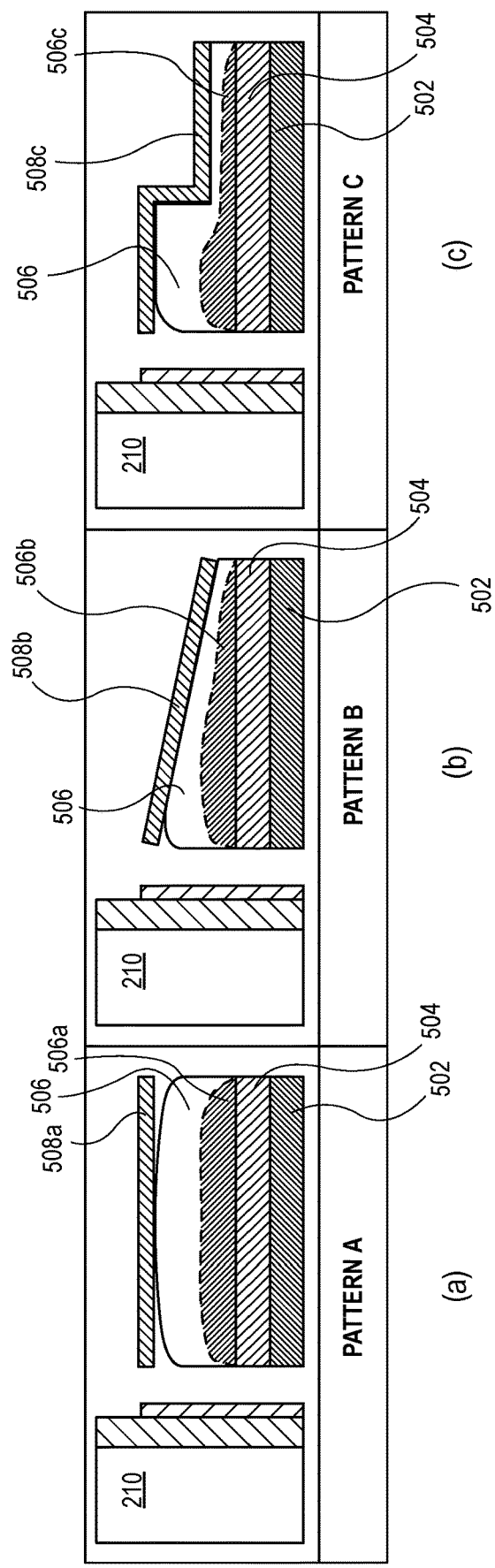
FIG. 5B is a diagrammatic cross-sectional view illustrating the use of various height stabilizer plates in the pre-solder bump production process of FIG. 5A, according to an embodiment.

FIG. 5B is a diagrammatic cross-sectional view illustrating the use of various alternative height stabilizer plates in the pre-solder bump production process of FIG. 5A, according to embodiments. View (a) depicts the application of a planar height stabilizer plate 508a applied substantially parallel to the substrate 502, to produce solder bumps 506a from the solder paste 506, having a substantially uniform height across the majority of a respective corresponding electrode pad 504 (pattern A), according to an embodiment. View (b) depicts the application of a planar height stabilizer plate 508b applied at an angle to the substrate 502, to produce solder bumps 506b from the solder paste 506, having a tapered height across the majority of a respective corresponding electrode pad 504 (pattern B), according to an embodiment. View (c) depicts the application of a multi-planar (e.g., stepped) height stabilizer plate 508c applied to the substrate 502, to produce solder bumps 506c from the solder paste 506, having a first raised height along a first portion of a respective corresponding electrode pad 504 and a second lower height along a second portion of the same respective corresponding electrode pad 504 (pattern C), according to an embodiment. The foregoing height stabilizer plate configurations are presented as non-limiting exemplary embodiments, as the form of plate used may vary from implementation to implementation based on component configurations and design needs.

Figure 5C:
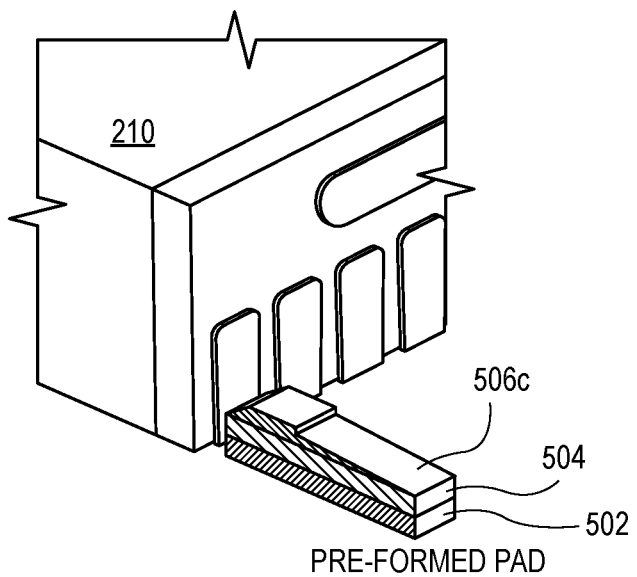
FIG. 5C is a diagram illustrating relative positioning of slider electrode pads and a pre-solder bump based on the pre-solder bump production process of FIG. 5A (using pattern C), according to an embodiment.

FIG. 5C is a diagram illustrating relative positioning of slider electrode pads and a pre-solder bump based on the pre-solder bump production process of FIG. 5A (using pattern C), according to an embodiment. Depicted is a portion of a slider 210, including constituent electrode pads 232, relative to a singular (for simplicity and clarity here) solder bump 506c, including the substrate 502 and electrode pad 504. The pre-formed solder bump 506c, and corresponding electrode pad 504, is positioned for electrical interconnection with the left-most electrode pad 232 of the slider 210 via, for example, a laser reflow process as described in more detail in reference to FIG. 6.

Electrically Interconnecting Pre-Formed Suspension Solder Bumps with Slider

Figure 6:
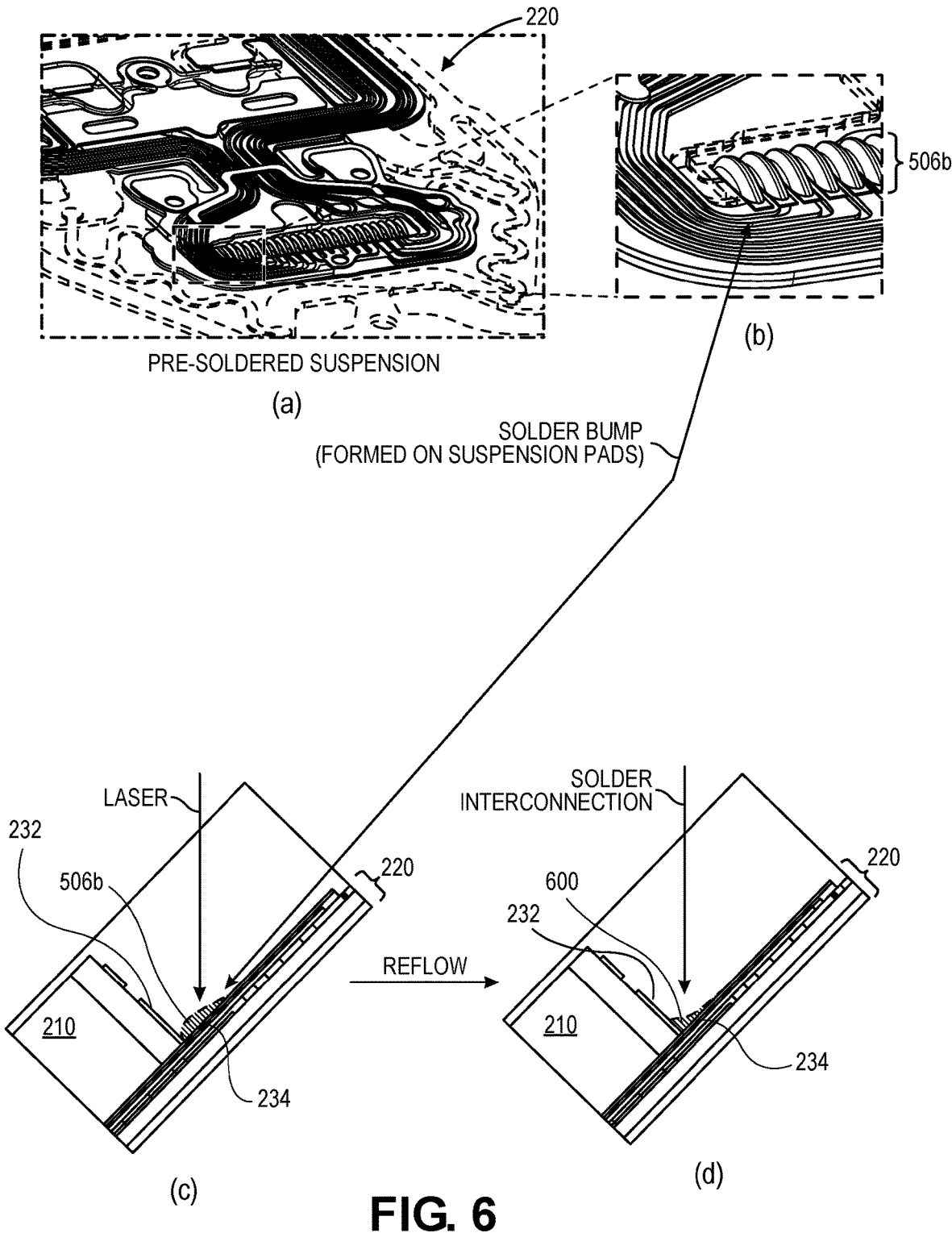
FIG. 6 is a diagram illustrating the use of pre-formed solder bumps formed on suspension electrode pads to interconnect with read-write head slider electrode pads, according to an embodiment.

FIG. 6 is a diagram illustrating the use of pre-formed solder bumps formed on suspension electrode pads to interconnect with read-write head slider electrode pads, according to an embodiment. View (a) depicts a perspective view of a "pre-soldered" suspension 220, having pre-formed solder bumps 506b (here, as pattern B as an example) as depicted in the magnified perspective view (b). The solder bumps 506b are further depicted in the side view (c), pre-formed on the assembly of suspension 220 and in positional relation to a corresponding slider 210. A heat source such as a laser, as known in the art, is utilized to reflow the solder bumps 506b into a solder interconnection 600, of side view (d), electrically interconnecting the electrode pads (see, e.g., pads 232 of FIG. 2D) of the slider 210 with the electrode pads (see, e.g., pads 234 of FIG. 2D) of the suspension 220.

Method of Electrically Interconnecting Head Slider and Suspension

Figure 7:
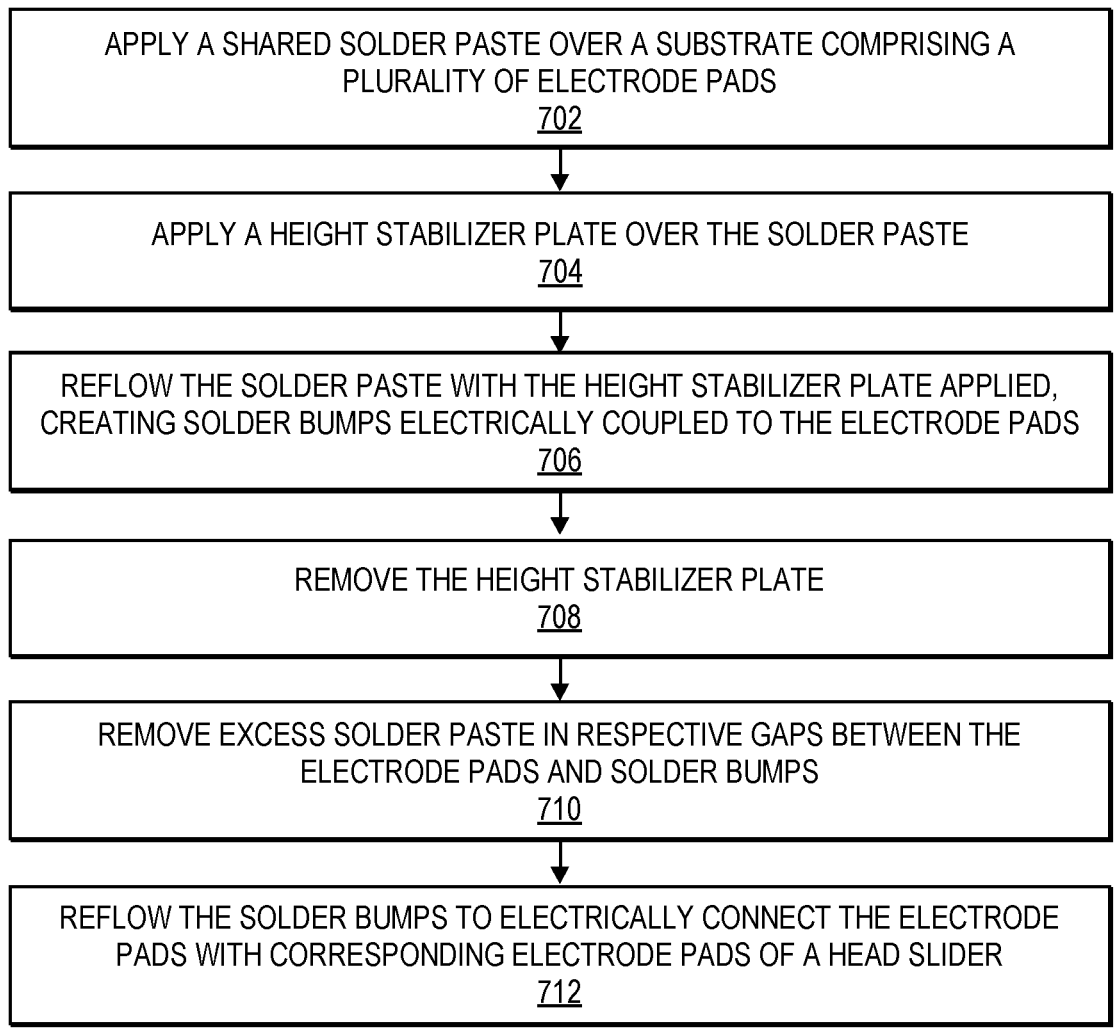
FIG. 7 is a flow diagram illustrating a method of electrically interconnecting a head slider and a suspension, according to an embodiment.

FIG. 7 is a flow diagram illustrating a method of electrically interconnecting a head slider and a suspension, according to an embodiment.

At block 702, a shared solder paste is applied over a substrate comprising a plurality of electrode pads. For example, solder paste 406, 506 (FIGS. 4, 5A, 5B) is applied over substrate 402, 502 (FIGS. 4, 5A, 5B) and pads 404, 504 (FIGS. 4, 5A, 5B).

At block 704, a height stabilizer plate is applied over the solder paste. For example, height stabilizer plate 408, 508, 508a-508c (FIGS. 4, 5A, 5B) is applied over the solder paste 406, 506.

At block 706, the solder paste is reflowed with the height stabilizer plate applied, creating solder bumps electrically coupled to the electrode pads. For example, solder paste 406, 506 is reflowed, such as by a laser reflow process, with the height stabilizer plate 408, 508, 508a-508c applied, creating solder bumps 406*b*, 506*a*-506*c* (FIGS. 4, 5A, 5B) electrically coupled to the electrode pads 404, 504.

At block 708, the height stabilizer plate is removed from the workpiece, and at block 710, excess solder paste is removed from respective gaps between the electrode pads and solder bumps. For example, the height stabilizer plate 408, 508, 508*a*-508*c* is removed, and excess solder paste 406, 506 is removed from respective gaps between the electrode pads 404, 504 and solder bumps 406*b*, 506*a*-506*c*, as known in the art (see, e.g., the washing stage (d) of FIG. 4).

The foregoing approaches to controlling the height and/or shape of a solder bump as described herein are considered suitable for, for a non-limiting example, electrically coupling a head slider to a suspension assembly for a hard disk drive, in a repeatable and reliable way. These techniques may be used to make pre-solder bumps with desired shapes and stable peaks. Recall that HDDs are expected to need 16 to 18 or more slider pads in upcoming products, with corresponding pad widths reducing to as small as 25 µm and gap widths reducing from 27 µm down to as little as 9 µm. Hence, through use of the described techniques, according to various embodiments the number of electrode pads electrically connecting a head slider to a suspension may be equal to or greater than sixteen (16), and the diameter of the solder bumps less than or equal to 25 µm with a pitch having gaps between the solder bumps of less than or equal to 17.5 µm, to meet the expected needs of near-term HDD designs. However, uses of these techniques may vary from implementation to implementation, as they generally enable solder bonding of extremely small electrical interconnection pads.

Physical Description of an Illustrative Operating Context

Embodiments may be used in the context of controlling the height and shape of a solder bump for electrically connecting a head slider to a suspension assembly, for use in a hard disk drive (HDD). Thus, in accordance with an embodiment, a plan view illustrating an HDD 100 is shown in FIG. 1 to illustrate an exemplary operating context.

Figure 1:
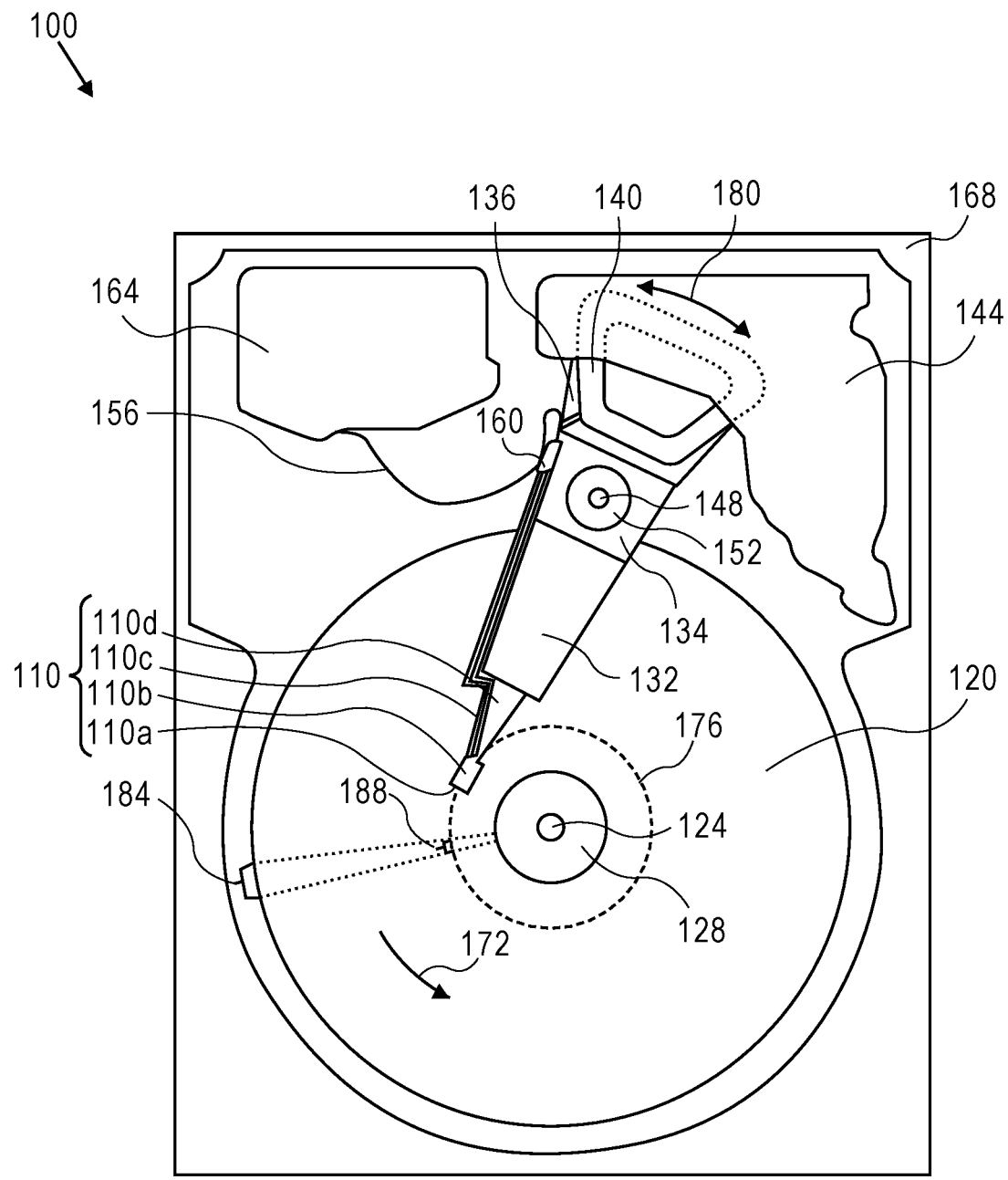
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110*a*) are transmitted by a flexible cable assembly (FCA) 156 (or "flex cable"), also at times referred to as a flexible printed circuit (FPC). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of manufacturing, the method comprising:
applying a shared solder paste over a substrate comprising a plurality of electrode pads;
applying a height stabilizer plate over the solder paste, comprising:
applying a planar plate applied at an angle to the substrate to produce solder bumps having a tapered height across a respective electrode pad, or
applying a multi-planar shaped plate applied to produce solder bumps having a first raised height along a first portion of a respective electrode pad and a second lower height along a second portion of the respective electrode pad;
reflowing the solder paste with the height stabilizer plate applied, creating the solder bumps electrically coupled to the electrode pads;
removing the height stabilizer plate; and
removing excess solder paste in respective gaps between the electrode pads and the solder bumps.

2. The method of claim 1, wherein the substrate is coupled with a suspension, the method further comprising:
reflowing the solder bumps to electrically couple the electrode pads with corresponding electrode pads of a head slider.

3. The method of claim 2, wherein a number of the electrode pads electrically coupling the head slider to the suspension is greater than or equal to sixteen (16).

4. The method of claim 1, wherein a diameter of the solder bumps is less than or equal to 25 micrometers (μm).

5. The method of claim 4, further comprising:
wherein the solder bumps have a pitch according to which the gaps between the solder bumps constituent to the substrate are less than or equal to 17.5 micrometers (μm).

6. The method of claim 1, wherein applying the height stabilizer plate includes applying the plate composed of a material from a group consisting of glass, ceramic, titanium, and stainless steel.

7. The method of claim 1, wherein applying the height stabilizer plate includes applying the height stabilizer plate directly over the solder paste.

8. A head gimbal assembly (HGA) of a hard disk drive (HDD), the HGA comprising:
a head slider; and
a suspension produced according to the method of claim 1,
wherein:
the solder bumps comprise a plurality of substantially uniform solder bumps of the suspension over the plurality of electrode pads of the suspension, and
the solder bumps have a tapered height across a majority of a corresponding electrode pad or have a first raised height along a first portion of a corresponding electrode pad and a second lower height along a second portion of the corresponding electrode pad.

9. The HGA of claim 8, wherein a number of the electrode pads of the suspension is greater than or equal to sixteen (16).

10. The HGA of claim 8, wherein a diameter of the solder bumps is less than or equal to 25 micrometers (μm).

11. The HGA of claim 10, further comprising:
wherein the solder bumps have a pitch according to which the gaps between the solder bumps are less than or equal to 17.5 micrometers (μm).

12. A hard disk drive suspension produced according to the method of claim 1, wherein:
the solder bumps comprise a plurality of substantially uniform solder bumps of the suspension over the plurality of electrode pads of the suspension, and
the solder bumps have a tapered height across a majority of a corresponding electrode pad or have a first raised height along a first portion of a corresponding electrode pad and a second lower height along a second portion of the corresponding electrode pad.

13. A system for forming a plurality of uniform solder bumps on a workpiece, the system comprising:
means for reflowing a shared solder paste applied over a substrate comprising a plurality of electrode pads; and
means for controlling a height of a plurality of solder bumps made from the shared solder paste and each electrically connected to one of the plurality of electrode pads, while inhibiting electrical bridging among adjacent solder bumps of the plurality of solder bumps, wherein the means for controlling a height of the plurality of solder bumps produces the solder bumps having a tapered height across a respective electrode pad, or produces the solder bumps having a first raised height along a first portion of a respective electrode pad and a second lower height along a second portion of the respective electrode pad.

14. The system of claim 13, wherein the means for controlling comprises a material from a group consisting of glass, ceramic, titanium, and stainless steel.

\* \* \* \* \*